May 10, 1960 J. K. BRADLEY 2,936,421

BRIDGE-TYPE PHASE DETECTOR

Filed July 13, 1954

INVENTOR.
JAMES K. BRADLEY
BY
ATTORNEY

United States Patent Office 2,936,421

Patented May 10, 1960

2,936,421

BRIDGE-TYPE PHASE DETECTOR

James K. Bradley, Wayne, Pa., assignor to Philco Corporation, Philadelphia, Pa., a corporation of Pennsylvania Application July 13, 1954, Serial No. 443,087

7 Claims. (Cl. 328—134)

Figure 1:
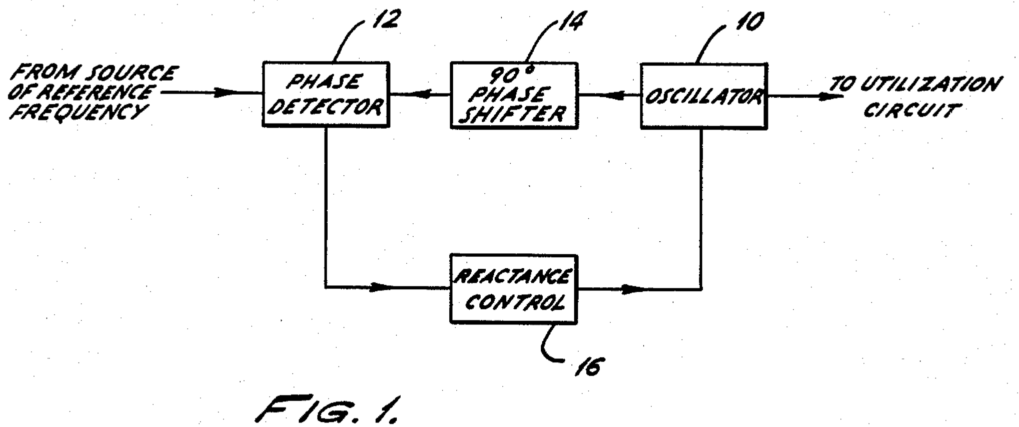

The present invention relates to electrical systems and more particularly to improved phase detector systems for producing an output signal having an amplitude and polarity as determined by the amount and sense of the phase difference between two signals having substantially the same carrier frequency. Such circuits are especially useful in color television systems for controlling the frequency and phase of an oscillator serving to provide a demodulation signal for the color subcarrier component of the received color video wave, and the invention will be specifically described in such use. However, it should be well understood that the phase detector circuits of the invention are also applicable to other systems in which a signal is required having amplitude and polarity variations as determined by the extent and sense of the departure of the phases of one carrier signal from a reference phase position established by a second carrier signal.

The video signal appearing at the detector of a color television receiver typically comprises horizontal and vertical synchronizing signals, a color video wave and a marker wave for providing a phase reference for the color-establishing component of the video wave. In practice, the horizontal and vertical synchronizing signals are in the form of time-spaced pulses recurring respectively at the horizontal and vertical scanning frequencies of the image to be reproduced. The color video wave occurs during the intervals between the horizontal pulses and may comprise a brightness or monochrome component having a frequency spectrum extending, for example, from 0 to 3.5 mc./sec., and a color establishing, or chromaticity, component in the form of a modulated subcarrier wave having a nominal frequency of approximately 3.58 mc./sec. The marker signal may be in the form of a burst of a small number of cycles of a carrier signal having a frequency equal to the frequency of the chromaticity subcarrier component of the color video wave, and occurs during the so-called backporch interval of the horizontal scanning pulses, so that these bursts recur at a frequency equal to the horizontal line scanning frequency, i.e. at a frequency of 15.75 kc./sec.

The marker or burst signal, serving as a phase reference for the color subcarrier of the video wave, may be used for demodulating the subcarrier in any of several manners. Most generally, the burst signal is used to synchronize a demodulation signal oscillator operating at the subcarrier frequency. To achieve the desired synchronization, the burst signal and the demodulation signal are supplied to a phase detector system which produces a control signal as determined by the difference between the phase of the carrier of the burst signal and the phase of the demodulation signal. The control signal so produced then serves to appropriately vary the frequency and phase of the oscillator.

Various forms of phase detector systems have been proposed for the above noted purpose. The phase detector system which has been most generally used so far has been of the type consisting essentially of a bridge network, two arms of which are formed by non-linear current carrying elements such as diode rectifiers or the like, and the remaining two arms of which are formed by two impedance elements, i.e. resistor elements, connected in series. One of the input signals is applied across two opposite junctions of the bridge and the other input signal is applied across the remaining two opposite junctions of the bridge. Since the bridge is usually grounded at one of its junction points, it is necessary to supply one of the input signals in a push-pull sense to the bridge, i.e. by means of a transformer or other form of phase splitting device, and to supply the other input signal in a single ended sense.

For best operation, the circuit supplying the push-pull signal should be precisely balanced with respect to the ground point of the phase detector, the two impedance arms of the detector should have equal values, and the two non-linear elements should have identical operating characteristics so that the non-linear elements produce equal output voltages when the two input signals are in phase quadrature. Under these conditions the further advantage is achieved that, by applying the reference signal as the push-pull signal, the detector is substantially immune to noise impulses which may be superimposed on the reference signal.

In practice, however, an absolute balance of the phase detector system as above noted is difficult to achieve, particularly when the signals to be phase compared have a relatively high frequency of the order of 3 mc./sec. or more, as is the case for the color reference signal and demodulation signal referred to above. This is due to the fact that unavoidable stray capacities exist in the detector circuit and their effects cannot readily be balanced out without disturbing the basic balance of the detector. Furthermore, it has been found that, if the signal supplied to the detector in single ended manner contains a second harmonic component which produces a waveform having non-symmetrical positive- and negative-going excursions, a true balance in the phase detector cannot be achieved because under these conditions the non-linear elements are not energized by signals of equal voltage variations.

It is an object of the invention to provide improved phase detector systems.

Another object of the invention is to provide improved phase detector systems which may be made to exhibit an accurate balance condition notwithstanding variations of the values of the components thereof from the values normally required to achieve a balanced condition in the detector.

A further object of the invention is to provide balanced phase detector systems suitable for operating at frequencies of the order of 3 mc./sec. or more.

Another object of the invention is to provide a phase detector system in which undesirable effects of harmonic components of an input signal thereto are obviated.

Further objects of the invention will appear as the specification progresses.

In accordance with the invention, in a phase detector system of the type embodying non-linear current carrying elements arranged in a bridge network, and in which the input signals are supplied to paired opposite terminals thereof, the foregoing objects are achieved by supplying one of the signals to the bridge network through a transmission path adapted to modify the amplitude and/or phase of an even order harmonic component of the said signal so that controllable amounts of the said harmonic component are applied to the bridge network. More specifically, and in accordance with the invention, in a phase detector system of the foregoing type, the foregoing objects are achieved by supplying the single ended signal to the bridge network through a transmission network adapted to attenuate and/or vary the phase of the second harmonic component of the single ended signal supplied to the bridge network.

Figure 2:
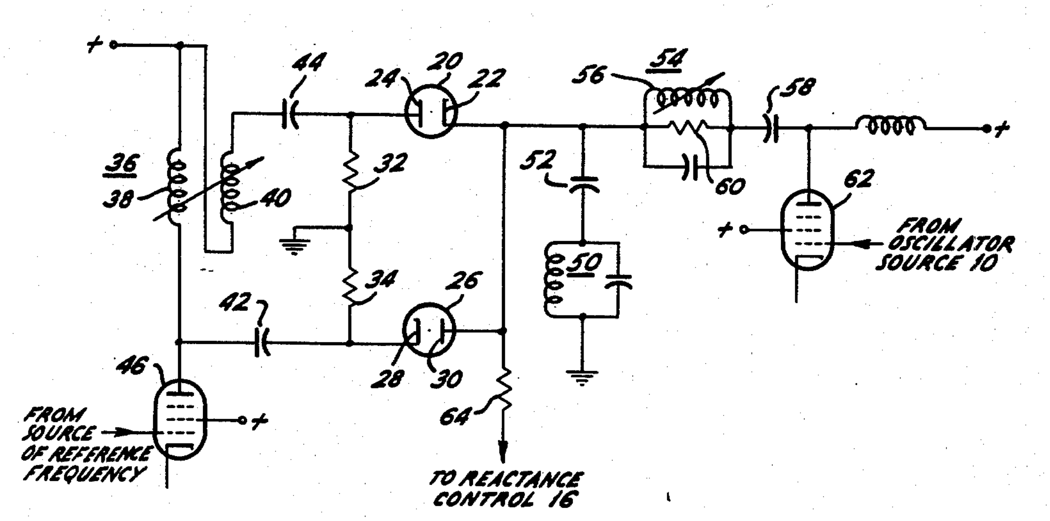

The invention will be described in greater detail with reference to the appended drawing forming part of the specification and in which:

Figure 1 is a block diagram of a system for synchronizing a demodulation signal oscillator of a color television receiver by means of an incoming reference signal, in which type system the phase detector of the invention is especially applicable; and Figure 2 is a schematic diagram of a preferred form of a phase detector in accordance with the invention.

Referring to Figure 1, the system there shown comprises an oscillator 10 which, in a color television receiver, may serve as the source for the demodulation signal for the chromaticity subcarrier component of the received color television video wave. As previously pointed out, for demodulating the chromaticity subcarrier component of the received color video wave, the demodulation signal must be maintained in accurate phase synchronism with the color subcarrier component. For this purpose the system shown in Figure 1 further comprises a phase detector 12 to which the oscillator signal is supplied through a phase shifter 14 and to which additionally is applied the color phase reference frequency signal described above. For varying the frequency and/or phase of the oscillator 10 there is provided a reactance control 16 which is energized by the output signal of the phase detector 12 and which is coupled to the oscillator 10.

Oscillator 10 may be conventional in form and may comprise an electron discharge device having its input and output electrodes coupled together in regenerative feedback relationship by means of a resonant circuit nominally tuned to the desired operating frequency, i.e. tuned to 3.58 mc./sec., the frequency of the subcarrier component of the received color video wave.

A suitable form of the phase detector 12 in accordance with the invention, and one adapted to produce an output signal having an amplitude and polarity as determined by the extent and sense of the difference between the phase of the carrier of the burst reference signal and the phase of the signal produced by the oscillator 10, will be described hereinafter with specific reference to Figure 2.

The 90° phase shifter 14 may consist of a delay line of appropriate length or may consist of an inductance-capacitance resonant circuit tuned to 3.58 mc./sec. which, when energized by a signal from the oscillator 10, produces an output signal in phase quadrature with the input signal. In practice, the 90° phase shifted signal produced by the phase shifter 14 may be derived directly from the oscillator 10 by appropriate coupling to the signal circuit thereof. Alternatively, the oscillator may be made to operate at a 90° phase displacement relative to the reference signal through the action of the phase control system and an output signal in the same phase sense as the reference signal may be obtained by the use of a quadrature phase shifting network (not shown) interposed between the output of the oscillator and the utilization circuit. In these latter cases, the use of the phase shifter 14 becomes unnecessary.

The reactance control 16 may assume any one of the well known forms and may typically consist of a Miller-type reactance tube which is connected in shunt with the resonant circuit of the oscillator 10 and is thereby adapted to vary the frequency and/or phase of the oscillator as determined by the value of the control signal applied thereto from the phase detector 12.

Referring now to Figure 2, which shows one preferred form of phase detector system 12 in accordance with the invention, the phase detector system there shown comprises a first non-linear current carrying element in the form of a diode rectifier 20 having a cathode 22 and an anode 24, and a second non-linear current carrying element in the form of a diode rectifier 26 having a cathode 28 and an anode 30.

The cathode 22 and anode 30 are directly connected together as shown, whereas the anode 24 and the cathode 28 are interconnected through serially connected resistors 32 and 34 having their junction connected to a point at ground potential. The resistors 32 and 34 serve as load impedances for the diode rectifiers and in practice the resistors preferably have equal ohmic values. In an alternative form the resistors 32 and 34 may be constituted by a potentiometer having its ends connected to the diodes 20 and 26 and having its movable arm connected to the point at ground potential.

The diodes are supplied with one input signal in push-pull relationship by means of a transformer 36 having balanced windings 38 and 40, the high signal potential end of the winding 38 being connected to the cathode 28 of diode 26 through a D.-C. blocking capacitor 42 and the high signal potential end of winding 40 being connected to the anode 24 of diode element 20 through a D.-C. blocking capacitor 44. The winding 38 forms the anode circuit of an amplifier tube 46, to the input control grid of which the burst signal of reference frequency and phase is supplied. The coupling between windings 38 and 40 is preferably adjustable so that equal voltages are applied to the diode elements 20 and 26.

The phase detector system shown further comprises an inductance-capacitance circuit 50 which is tuned to the frequency of the second signal to be supplied to the detector, i.e. tuned to the fundamental frequency of the signal supplied by the oscillator 10 in the system of Figure 1, and an inductance-capacitance-resistance network 54 the resonant frequency of which is adjustable i.e. by varying the inductance thereof, to a value equal to or approximating the second harmonic frequency of the signal from the oscillator 10. Circuit 50 is connected through a D.-C. blocking capacitor 52 between the junction of cathode 22 and anode 30 and the point at ground potential whereas the network 54 is connected in series between the said junction and the input signal source. The signal to be controlled is supplied to the diodes 20 and 26 in the same phase sense through the network 54, and across the tuned circuit 50 by means of a buffer amplifier tube 62 which is coupled to the phase detector system through a D.-C. blocking capacitor 58. It will be noted that, by means of the arrangement just described, the network 54, in combination with the circuit 50, serves to control the intensity and phase of the second harmonic component from the input signal source as determined by the tuning adjustment of the network 54, whereby adjustments of the inductor 56 of the network to one side of resonance produces a second harmonic signal with a leading phase and adjustment of the inductor to the other side of resonance produces a second harmonic signal with a lagging phase.

The output signal of the detector appears at the junction of cathode 22 and anode 30 and may be derived therefrom through isolating resistor 64, as shown. This output has an amplitude and polarity determined by the extent and sense of the phase departure of the signals supplied to tubes 46 and 62, and is suitable for application to the reactance control 16 in the system of Figure 1.

As pointed out above, the system of the invention has particular advantages as a phase detector for signals having a relatively high frequency value, for example of the order of 3.5 mc./sec. as is the case for the color phase synchronizing signal of a color television receiver. At such high frequencies, the prior phase detectors have been seriously handicapped because unavoidable second order effects in the detector system could not be readily compensated without producing an unbalanced condition in the detector circuit. For example, it has been found that, because of normally existing differences in the perveance values of the diode elements, because of the presence of harmonic components in the input signal, and/or because of stray capacitance effects it was necessary, in prior art bridges, to unbalance the values of the diode load resistors and/or to unbalance the input voltages to the detector by varying the effective center point of the input transformer in order to achieve a null condition when the input signals to the bridge were in phase synchronism. When the detector is falsely balanced in this manner, it is found that the phase detector is responsive additionally to variations of the amplitude of the input signal so that a true measure of the phase difference between the input signals cannot be achieved. In the novel phase detector of the invention a true balance condition may be initially set up and the second order effects above referred are obviated by controlling the amount and phase of the second harmonic component injected into the detector. More particularly, by means of the circuit 54, second harmonic components contained in the signal from the tube 62 are either prevented from appearing at the common junction of the diode elements or are injected in a desired amount and phase to cancel unbalances of the detector normally produced by differences between the operating characteristics of the diode elements and/or by stray capacitance in the detector circuit.

For best results the tuned circuit 50 should have a relatively high ratio of inductance to capacity and the tuned circuit 54 should have a relatively low Q of the order of 5 to 10, the latter being readily achieved by an appropriate selection of the value of the damping resistor 60 of this circuit.

Typical values for the components of the phase detector illustrated may be as follows:

| | |
|---|---|
| Tubes **46** and **62** | Type 6AU6. |
| Diodes **20** and **26** | Type 6AL5. |
| Capacitors **42, 44, 52** and **58** | .002 $\mu$f. |
| Resistors **32** and **34** | 1 megohm. |
| Resistor **64** | 50,000 ohms. |

While I have described my invention by means of specific examples and in a specific embodiment, I do not wish to be limited thereto for obvious modifications will occur to those skilled in the art without departing from the spirit and scope of the invention.

What I claim is:

1. An electrical circuit arrangement comprising first and second non-linear current carrying elements, a source of a first input signal of reference frequency and phase, a source of a second input signal having a frequency and phase approximating the frequency and phase of said first signal, means for applying one of said signals in phase opposition to said non-linear elements, means for applying the other of said signals in the same phase sense to said non-linear elements, resonant means adapted to control the intensity and phase of a predetermined higher harmonic component than the fundamental frequency of one of said signals, said latter means being interposed between the source of said last-mentioned signal and said non-linear elements, and means for deriving from said non-linear elements an output signal having amplitude and polarity variations as determined by variations of the phase of one of said input signals relative to the phase of the other of said input signals.

2. An electrical circuit arrangement comprising first and second non-linear current carrying elements, each having a first and a second electrode, means interconnecting one of the electrodes of each of said elements to form a first junction point, first and second resistance elements connected in series to form a second junction point, said resistance elements having their free ends connected to the other of the electrodes of said non-linear elements and said second junction point being connected to a point of reference potential, a source of a first signal of given reference frequency and phase, means for applying said first signal to the said other electrodes of said non-linear elements in push-pull sense with respect to said point of reference potential, input signal means for a second signal having a frequency approximating the frequency of said first signal and having a variable phase, means for applying said second signal to the said first junction point in single ended sense with respect to the said point of reference potential, a first inductance-capacitance circuit having a resonant frequency substantially equal to the frequency of said second signal interposed between said first junction point and said point of reference potential, a second inductance-capacitance circuit having a resonant frequency approximating the second harmonic frequency of said second signal interposed between said second signal input means and said first junction point, and means for deriving from said first junction point an output signal quantity having intensity variations as determined by phase variations of said second signal relative to the phase of said first input signal.

3. An electrical circuit arrangement as claimed in claim 2 wherein said second inductance-capacitance circuit is adjustable to vary the phase transmission characteristic thereof and further comprises a damping resistor.

4. An electrical circuit arrangement comprising first and second non-linear current-carrying elements, each having a cathode and an anode, means interconnecting the cathode of the first of said elements and the anode of the second of said elements to provide a first junction point, first and second resistance elements connected in series, said resistance elements having their common junction connected to a point of reference potential and having their free ends connected respectively to the anode of said first non-linear element and to the cathode of said non-linear second element, first input means for a first signal of given reference frequency and phase, transformer means energized by said first signal and connected so as to apply said first signal in one phase polarity to the anode of said first non-linear element and in opposite phase polarity to the cathode of said second non-linear element, second input means for a second signal having a frequency approximating the frequency of said first signal and being variable in phase relative to the phase of said first signal, a signal transmission path interconnecting said second input means and said first junction point, said transmission path including a resonant circuit and being adapted to transmit signals having a frequency approximating the frequency of said second signal and being adapted to attenuate and modify the phase of signals having a frequency approximating the second harmonic of said second signal, an inductance-capacitance circuit having a resonant frequency substantially equal to the frequency of said second signal interposed between said first junction point and said point of reference potential, and output circuit means coupled to said first junction point for deriving an output signal having intensity variations as determined by phase variations of said second signal relative to the phase of said first signal.

5. An electrical circuit arrangement comprising first and second non-linear current carrying elements, a source of a first input signal of reference frequency and phase, a source of a second input signal having a frequency and phase approximating the frequency and phase of said first signal, means for applying one of said signals in phase opposition to said non-linear elements, means for applying the other of said signals in the same phase sense to said non-linear elements, resonant circuit means interposed between the source of said last-mentioned signal and said non-linear elements for controlling the intensity and phase of a predetermined higher harmonic component than the fundamental frequency of one of said signals, and means for deriving from said non-linear elements an output signal having variations as determined by variations of the phase of one of said input signals relative to the phase of the other of said input signals.

6. An electrical circuit arrangement comprising first and second non-linear current-carrying elements, a source of a first input signal of reference frequency and phase, a source of a second input signal having a frequency and phase approximating the frequency and phase of said first signal, means for applying one of said signals in phase opposition to said non-linear elements, means for applying the other of said signals in the same phase sense to said non-linear elements, resonant means adapted to control the intensity and phase of a predetermined harmonic component of one of said signals, said resonant means comprising an inductance-capacitance circuit having a resonant frequency approximating the frequency of the second harmonic of one of said input signals and a resistive element shunting said resonant circuit, said resonant means being interposed between the source of said last-mentioned signal and said non-linear elements, and means for deriving from said non-linear elements an output signal having amplitude and polarity variations as determined by variations of the phase of one of said input signals relative to the phase of the other of said input signals.

7. An electrical circuit arrangement comprising first and second non-linear current-carrying elements, a source of a first input signal of reference frequency and phase, a source of a second input signal having a frequency and phase approximating the frequency and phase of said first signal, means for applying said first input signal in push-pull sense to said non-linear elements, means for applying said second input signal in single ended sense to said non-linear elements, resonant means adapted to control the intensity and phase of a predetermined harmonic component of one of said signals, said resonant means comprising an inductance-capacitance circuit having a resonant frequency approximating the frequency of the second harmonic of said second input signal connected in series with said second signal source and said non-linear elements, and means for deriving from said non-linear elements an output signal having amplitude and polarity variations as determined by variations of the phase of one of said input signals relative to the phase of the other of said input signals.

References Cited in the file of this patent

UNITED STATES PATENTS

| | | |
|---|---|---|
| 1,932,435 | Aiken et al. | Oct. 31, 1933 |
| 2,231,704 | Curtis | Feb. 11, 1941 |
| 2,501,077 | Murakami | Mar. 21, 1950 |
| 2,510,095 | Frankel | June 6, 1950 |
| 2,634,367 | Joseph | Apr. 7, 1953 |
| 2,744,155 | Kihn | May 1, 1956 |
| 2,771,508 | Creamer | Nov. 20, 1956 |
| 2,802,045 | Landon | Aug. 6, 1957 |